(12) United States Patent
Gassner

(10) Patent No.: US 10,914,363 B2
(45) Date of Patent: Feb. 9, 2021

(54) SLIDER FOR AN ACTUATOR

(71) Applicant: LIMOSS (DONGGUAN) CO., LTD., Guangdong (CN)

(72) Inventor: Christian Gassner, Shenzhen (CN)

(73) Assignee: LIMOSS (DONGGUAN) CO., LTD., Guangdong (CN)

( * ) Notice: Subject to any disclaimer, the term of this patent is extended or adjusted under 35 U.S.C. 154(b) by 0 days.

(21) Appl. No.: 16/403,839

(22) Filed: May 6, 2019

(65) Prior Publication Data
US 2019/0257396 A1    Aug. 22, 2019

Related U.S. Application Data

(63) Continuation-in-part of application No. 14/861,166, filed on Sep. 22, 2015, now Pat. No. 10,323,741.

(30) Foreign Application Priority Data

May 6, 2015   (CN) ................ 2015 2 0286725 U

(51) Int. Cl.
   *F16H 21/04*        (2006.01)
   *F16H 21/44*        (2006.01)
   (Continued)

(52) U.S. Cl.
   CPC .......... *F16H 21/04* (2013.01); *F16H 21/16* (2013.01); *F16H 21/44* (2013.01); *A47C 20/041* (2013.01)

(58) Field of Classification Search
   CPC .......... F16H 57/025; F16H 57/039; F16H 2025/2031; F16H 2025/2037; F16H 2025/204; F16H 25/20; F16H 25/2025; F16H 25/2409; F16H 25/24; F16H 2025/2445; F16H 2025/2081; F16H 2025/2084; B60N 2/067; B60N 2/0232; B60N 2/164; B60N 2/1853; B60N 2002/0236; A47C 7/462; A47C 7/402; B66F 3/18; B66F 3/44; B66F 1/06; B66F 1/02; Y10T 74/18576; Y10T 74/18648;
   (Continued)

(56) References Cited

U.S. PATENT DOCUMENTS 924,743 A  *  6/1909  Cox et al. .............. B23Q 5/32
                                                    74/841
5,927,144 A     7/1999  Koch
(Continued)

FOREIGN PATENT DOCUMENTS

EP      0708266 A1    4/1996
EP      2690314 A1    1/2014

*Primary Examiner* — Daniel D Yabut
(74) *Attorney, Agent, or Firm* — JCIP Global Inc.

(57) ABSTRACT

A slider for an actuator, the slider comprises a driving plate that moves under a driving force of a driving unit of the actuator, and a linkage lever channel arranged in the driving plate. A sliding track channel is disposed inside the driving plate, and the slider is sleeved on a sliding track of the actuator through the sliding track channel. When the slider moves along the sliding track of the actuator, a component to be driven is driven to move together. The slider for the actuator of the application has simple assembly process, convenient and quick assembly method, and can be applied to connecting different kinds of components to be driven to meet different user's requirements.

17 Claims, 4 Drawing Sheets

(51) Int. Cl.
*F16H 21/16* (2006.01)
*A47C 20/04* (2006.01)

(58) Field of Classification Search
CPC ......... Y10T 74/18616; Y10T 74/18608; Y10T 74/18656; Y10T 74/1974; Y10T 74/19735; Y10T 74/19823; Y10T 74/1527; Y10T 74/173; Y10T 74/20504; F16L 3/126; F16L 3/123; F16L 3/1207; F16L 3/1016; F16L 3/105; F16L 3/1091; F16L 3/1211; F16L 3/1215; F16L 3/1222; F16L 3/1008; F16L 3/1025; F16L 25/12; F16L 27/113; F16L 27/1133; F16L 27/1136
See application file for complete search history.

(56) References Cited

U.S. PATENT DOCUMENTS

| | | | |
|---|---|---|---|
| 6,334,733 B1* | 1/2002 | Tyson | F16B 7/182 |
| | | | 403/306 |
| 2010/0064830 A1 | 3/2010 | Zeng | |
| 2016/0101711 A1* | 4/2016 | Lei | B60N 2/067 |
| | | | 297/463.1 |

* cited by examiner

SLIDER FOR AN ACTUATOR

CROSS REFERENCE TO RELATED APPLICATIONS

The application is the continuation-in-part application of U.S. patent application Ser. No. 14/861,166, filed on Sep. 22, 2015, which claims the priority of Chinese patent application No. 201520286725.1, filed on May 6, 2015, the entire contents of all of which are incorporated herein by reference.

FIELD OF THE INVENTION

The present invention relates to the field of slider, and more particularly, to a slider for an actuator.

BACKGROUND

A slider is also called a driving plate, which is often used as a connection component for a device including but not limited to a medical instrument, a sofa seat, applied to connecting a component to be driven thereof. The slider drives the component to be driven to move together under a driving force generated by a component such as a motor, capable of manually or automatically lifting or extending the device.

However, the electric adjustable devices in the prior art often have a complicate connection structure, which leads to a concealed connection portion or a complicated assembly method for a slider, and further resulting in an inconvenience for an assembly or a replacement. What's more, an assembly operation space in the prior art is small, resulting in a low efficiency in an assembly or replacement operation.

Therefore, the current technology needs to be improved and developed.

BRIEF SUMMARY OF THE DISCLOSURE

The present disclosure relates to slider for an actuator, the slider is applied to driving a component to be driven that connected with the actuator to move together with the actuator. More particularly, the present disclosure relates to a slider sleeved on a driving unit of an actuator, the slider comprises a driving plate that does a linear motion under a driving force from the driving unit, and a linkage lever channel locates in the driving plate, the linage level channel penetrates the driving plate. The driving plate has a sliding track channel, the sliding track channel also penetrates the driving plate while being isolated from the linkage lever channel, and the driving plate is sleeved on a sliding track of the actuator through the sliding track channel. A spindle channel is detachably arranged in the sliding track channel, or the spindle channel is integrally arranged with the sliding track channel.

In one aspect, the driving plate disclosed in the present disclosure further comprises a driving plate head cover and a driving plate body, the driving plate body engages with the driving plate head cover to form the linkage lever channel, both the sliding track channel and the spindle channel are arranged on the driving plate body. The driving plate head cover is engaged with the driving plate body and forming a plurality of first fixing pin channels, a same number of a second fixing pin channel is arranged corresponding to the first fixing pin channels in the driving plate body, and the same number of third fixing pin channel is arranged corresponding to the first fixing pin channels and the second fixing pin channels. A fixed column is disposed on the driving plate body, the fixed column locates in the linkage lever channel. A first groove is disposed on the driving plate head cover, and the fixing column contacts with the first groove when the driving plate head cover and the driving plate body are in the engaging connection state.

In another aspect, the slider disclosed in the present disclosure, wherein, a linkage lever is fixedly arranged into the driving plate, the linkage lever penetrates the linkage lever channel, and the linkage lever comprises a tube, the tube comprises an intermediate tube, the intermediate tube passes through the linkage lever channel, a first split tube connected to one end of the intermediate tube, a second split tube connected to another end of the intermediate tube and disposed opposite to the first split pipe. The intermediate tube fixedly connects with the first split tube and the second split tube respectively by a plurality of screws. One side of the linkage lever channel is provided with a second groove, a size of the second groove is larger than a size of an opening of the linkage lever channel, the intermediate tube has a protruding edge, and the second groove adapts to the protruding edge.

In general, a structure of the slider and a connection method between the tube and the slider match to the components to be driven, such as a linkage lever, and according to a plurality of different kinds of components to be driven, a plurality of different structures of a slider and a plurality of different fixing methods between the tube and the slider are selected.

DETAILED DESCRIPTION OF EMBODIMENTS

Figure 1:
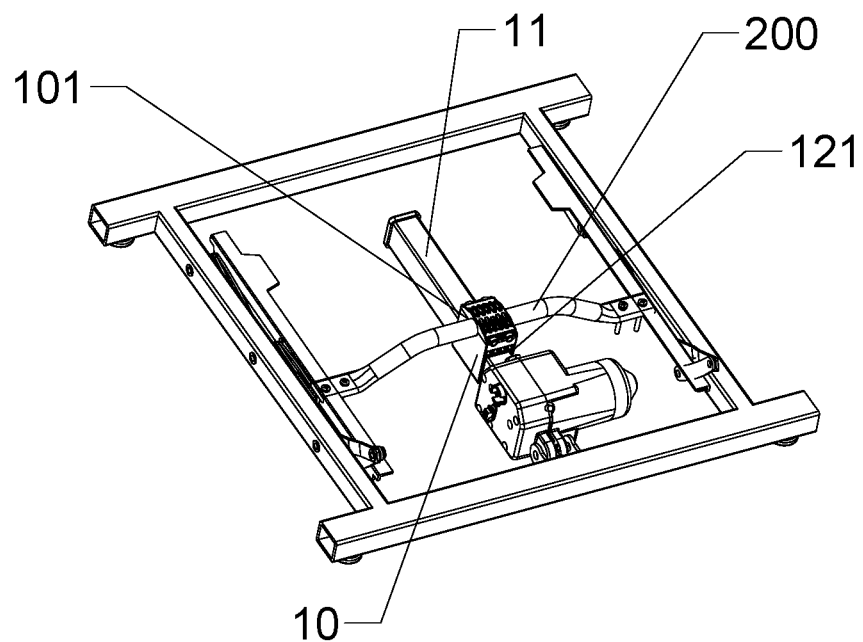
FIG. 1 illustrates a schematic diagram on a working state of the slider for the actuator disclosed in the present disclosure.

The following detailed description includes references to the accompanying drawing, which forms a part of the detailed description. The drawing shows, by way of illustration, specific embodiments in which the invention may be practiced. These embodiments are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, a term "and/or" refers to any one of the items, any combination of the items, or all of the items with which this term is associated.

As used herein, a singular forms "a," "an," and "the" include plural reference unless the context clearly dictates otherwise.

As used herein, a plurality of terms "include," "for example," "such as," and the like are used illustratively and are not intended to limit the present invention.

As used herein, a plurality of terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "parallel", "vertical", "beneath", "below", "inside" and "outside" in this description are merely used to identify the various elements as they are oriented in the FIGS, with "parallel", "vertical" and "below" being relative to the apparatus. These terms are not meant to limit the elements that they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 2:
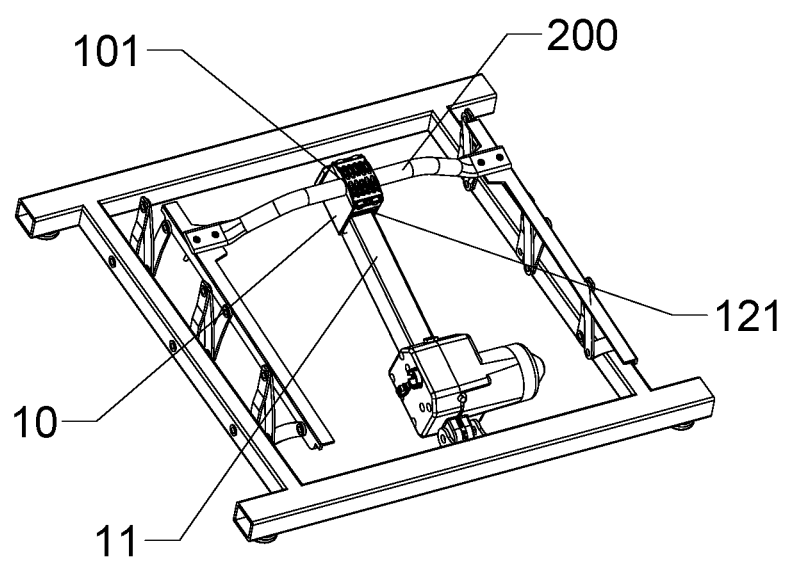
FIG. 2 illustrates a schematic diagram on another working state of the slider for the actuator disclosed in the present disclosure.
Figure 3:
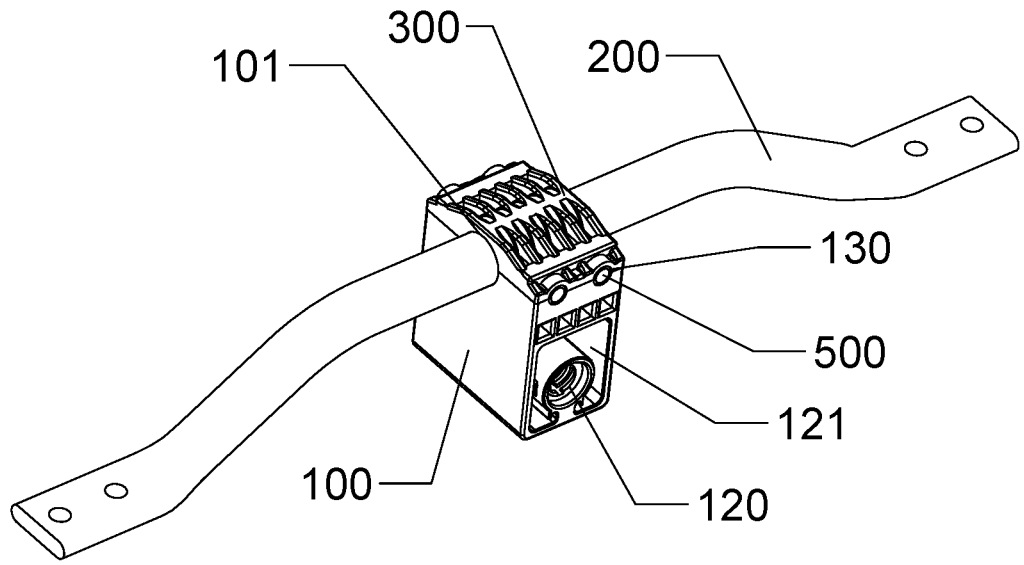
FIG. 3 illustrates a schematic diagram on a structure of an embodiment of the slider for the actuator disclosed in the present disclosure.
Figure 4:
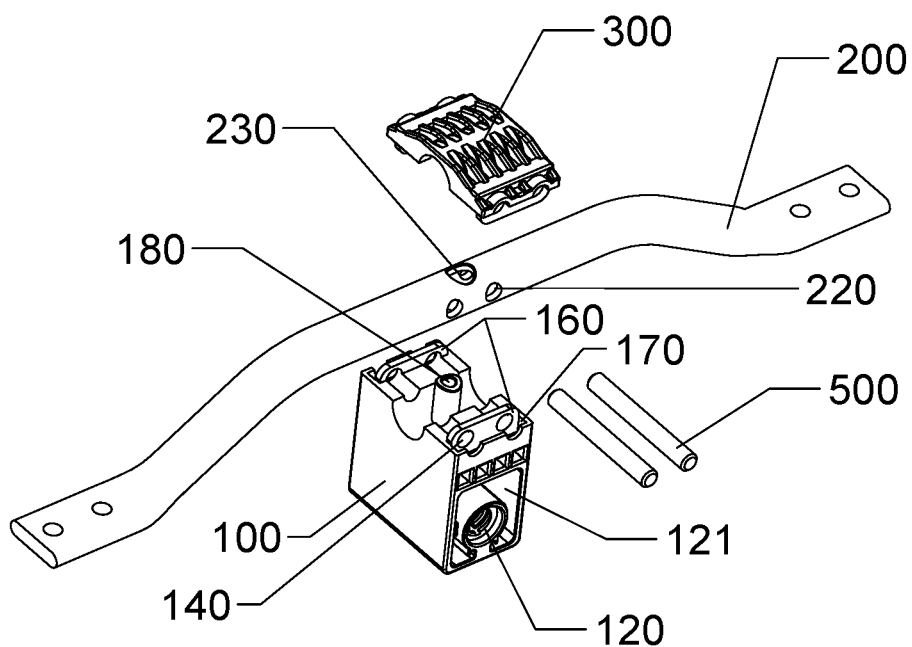
FIG. 4 illustrates an exploded diagram on a structure of an embodiment of the slider for the actuator disclosed in the present disclosure.

As shown in FIG. 1 and FIG. 2, an actuator is mounted on a frame of an electric chair, a slider for the actuator connects the actuator and a linkage lever. The slider for the actuator comprises a driving plate 10 and a linkage lever channel 101 arranged in the driving plate 10 and penetrating the driving plate 10. The driving plate 10 is provided with a sliding track channel 121 and sleeves on a sliding track 11 of the actuator through the sliding track channel 121. As shown in FIGS. 3-4 and FIGS. 6-7, the sliding track channel 121 locates in and penetrates the driving plate 10, while isolates from the linkage lever channel 101. Preferably, the sliding track channel 121 is disposed below the linkage lever channel 101 and perpendicular to the linkage lever channel 101. Preferably, an inner wall of the sliding track channel 121 is smooth without any threads. As shown in FIG. 1 and FIG. 2, the driving plate 10 is sleeved on the sliding track 11 of the actuator through the sliding track channel 121, thereby being able to do a linear motion back and forth smoothly along the sliding track 11 driven by a driving unit of the actuator, while a moving trajectory is determined by the sliding track 11. Preferably, both ends of the slide track 11 may respectively be provided with a limit switch, and the driving plate 10 contacts to the limit switches to determine a stroke of the slider. For example, the driving plate 10 of the slider may slide move back and forth linearly on the sliding track 11. As shown in FIG. 3 and FIG. 4, a spindle channel 120 is disposed in the sliding track channel 121, the spindle channel 120 is able to be detached from the driving plate 10 or integrally formed with the driving plate 10, preferably, the spindle channel 120 is arranged in parallel with the sliding track channel 121. After starting the driving unit (for example, a motor), as shown in FIG. 2, by a spindle (not shown) rotating in the spindle channel 120, the slider starts to slide, and to actuate the component to be driven to move, such as lifting a chair. Preferably, a cross section of the sliding track channel 121 is n-shaped, thus being able to be stably sleeved on the sliding track 11 of the actuator, avoiding any deviations during a sliding process of the driving plate 10, and providing a linear track for the driving plate 10 to move back and forth. A cross section of the spindle channel 120 is set as a circular, and the spindle channel 120 is provided within a spindle. Combining with FIGS. 1-4, it can be seen that, the driving plate 10 is sleeved on the sliding track 11 of the actuator through the sliding track channel 121. The spindle is housed within the sliding track 11, and by the spindle having an external screw thread engaging with the spindle channel 120, when the spindle rotates, the driving plate 10 is driven to slide along the sliding track 11, and to actuate the linkage lever that passes through the linkage lever channel 101 and the components to be driven that connects to the linkage lever to move together. It can be seen that, the slider for the actuator disclosed in the present disclosure, has a simple processing assembly method, and a lower cost, while being able to meet a plurality of user's requirements.

In order to illustrate the slider for the actuator disclosed in the present disclosure more clearly, a plurality of embodiments are listed thereafter.

Embodiment 1

As shown in FIG. 3, the driving plate 10 comprises a driving plate body 100 and a driving plate head cover 300. The driving plate body 100 engages with the driving plate head cover 300 to form the linkage lever channel 101. A linkage lever passes through the linkage lever channel 100, and is fixed into the linkage lever channel 101 by a fixing pin 500. In the present embodiment, the linkage lever is a tube 200, the tube is sleeved and fixed into the driving plate 10 through the linkage lever channel 101. The tube 200 may be set to a plurality of different shapes according to the components to be driven, such as an arcuate shape, so as to assemble with the components to be driven easily. In addition, the tube 200 may be fixed with the driving plate 10 through a plurality of connection methods including but not limited to: fixed by a plurality of screws, fixed by a plurality of fixing pins, fixed by a method of using splitting tubes, and more. According to a difference in a shape, a weight or a material of the components to be driven, it is able to choose a plurality of different fixing methods to connect the tube 200 and the driving plate 10. The material of the linkage lever can be metal, alloy or plastic. However, both the linkage lever and the tube are not in the scope of the present disclosure.

Figure 5:
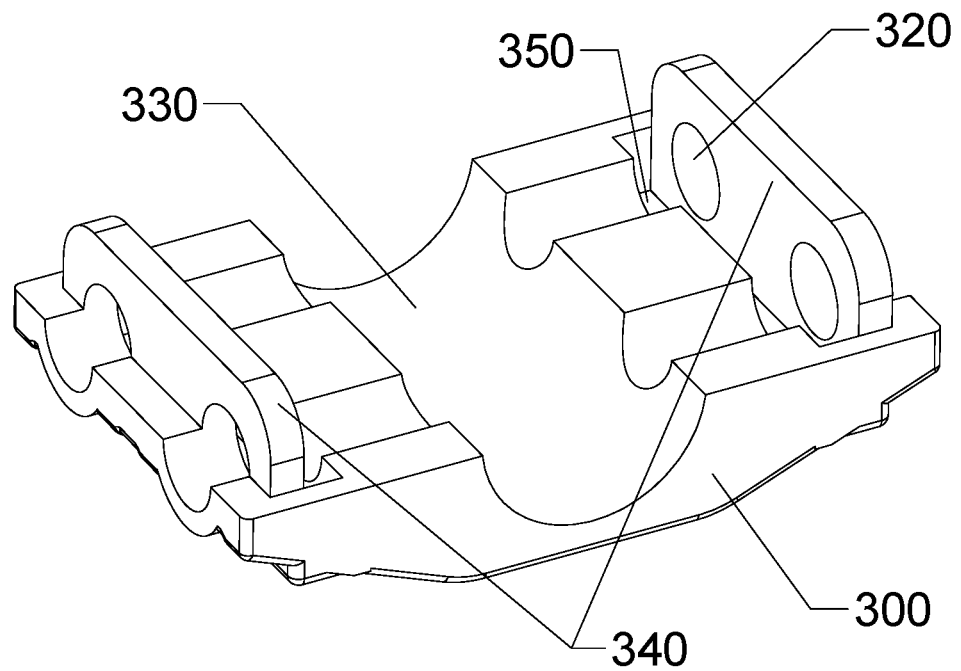
FIG. 5 illustrates a schematic diagram on an inside of the driving plate head cover in an embodiment of the slider for the actuator disclosed in the present disclosure.

As shown in FIG. 3 and FIG. 4, the driving plate head cover 300 engages with the driving plate body 100 to form a plurality of first fixing pin channels 130, and a first positioning baffle 160 is disposed on the driving plate body 100, preferably, the first positioning baffle 160 is a pair of baffles disposed in parallel. Each of the first positioning baffles 160 is provided with a plurality of second fixing pin channels 140, and the second fixing pin channels 140 are arranged corresponding to the first fixing pin channels 130. As shown in FIG. 5, the driving plate head cover 300 is provided with a second positioning baffle 340, preferably, the second positioning baffle 340 is a pair of baffles disposed in parallel. Each of the second positioning baffles 340 is provided with a plurality of third fixing pin channels 320, and the third fixing pin channels 320 are arranged correspondingly to both the first fixing pin channels 130 and the second fixing pin channels 140. Preferably, a quantity of the first fixing pin channels, the second fixing pin channels and the third fixing pin channels are the same. As shown in FIG. 4, the driving plate body 100 is further provided with a pair of third grooves 170 disposed in parallel, the third grooves 170 are arranged between the first fixing pin channel 130 and the first positioning baffle 160 on a same side, while the third groove 170 is disposed corresponding to the second positioning baffle 340 and configured to hold the second positioning baffle 340. As shown in FIG. 5, the driving plate head cover 300 is further provided with a first groove 330 and a pair of fourth grooves 350 disposed in parallel. The first groove 330 is arranged in a middle of the driving plate head cover 300. The fourth grooves 350 are disposed between the third groove 330 and the second positioning baffle 340, while the fourth grooves 350 are disposed corresponding to the first positioning baffle 160 and configured to hold the first positioning baffle 160. When the driving plate head cover 300 is engaged with the driving plate body 100, the first positioning baffle 160 and the second positioning baffle 340 are embedded into each other, the second positioning baffle 340 is embedded with the third groove 170, and the first positioning baffle 160 is embedded with the fourth groove 350, so as to achieve a positioning function, while improving a connection stability between the driving plate body 100 and the driving plate head cover 300. In such a way, a fixed connection between the driving plate head cover 300 and the driving plate body 100 may be further achieved.

As shown in FIG. 4, the tube 200 according to the present embodiment is provided with a first through hole 220, the first through hole 220 is disposed correspondingly to the first fixing pin channel 130, the second fixing pin channel 140 and the third fixing pin channel 320. After the driving plate head cover 300 is engaged with the driving plate body 100, the fixing pin 500 passes through the first fixing pin channel 130, the third fixing pin channel 320, the second fixing pin channel 140, and the first through hole 220 in the tube 200, on one side of the slider sequentially, followed by passing through the second fixing pin channel 140, the third fixing pin channel 320 and the first fixing pin channel 130 on another side of the slider sequentially, before achieving a connection between the driving plate 10 and the tube 200. Preferably, there are two or more the fixing pins 500, and then the assembly process for each of the fixing pin is the same. The connecting method has a simple processing and assembly process, a low cost and a good stability after assembly, being able to satisfy a user's usage requirements.

Further, the driving plate body 100 is provided with a fixing column 180. The fixing column 180 is disposed in the linkage lever channel 101, applied to restraining the tube 200 during an assembly process. During an assembly process of the present embodiment, the fixing column 180 passes through the tube 200 and restrains the tube 200 from sliding left to right horizontally, so as to make it convenient to assemble the tube 200 efficiently. As shown in FIG. 4, the tube 200 is further provided with a second through hole 230, the second through hole 230 is disposed corresponding to the fixing column 180. After engaging the driving plate head cover 300 with the driving plate body 100, the fixing column 180 passes through the second through hole 230 before contacting with the first groove 330. Thereby the first fixing pin channel 130, the second fixing pin channel 140, the third fixing pin channel 320 and the first through hole 220 on the tube 200 are kept stable during a pin inserting process, so as to reduce a difficulty of assembly. In a specific embodiment, the tube 200 is first disposed on the fixing column 180 of the driving plate body 100 through the second through hole 230, then the driving plate head cover 300 is engaged with the driving plate body 100, the fixing column 180 contacts with the third groove 330. The first fixing pin channel 130, the second fixing pin channel 140, the third fixing pin channel 340 and the first through hole 220 of the tube 200 are all aligned with each other thereafter. The fixing pin 500 passes through the first fixing pin channel 130, the second fixing pin channel 140, the third fixing pin channel 340 and the first through hole 220, before the tube 200 is fixed in the driving plate 10. In other embodiments, the fixing pin 500 may be omitted, but a through hole is arranged in the driving plate head cover 300, a screw penetrates sequentially the through hole, and the second through hole 230 in the tube, before being fixed onto the fixing column 180, so as to fix the driving plate head cover 300, the tube 200 and the driving plate body 100 to each other. Finally, the tube 200 connects to a component to be driven, such as a sofa base, a chair connecting lever, etc., before the driving plate 10 is sleeved on the sliding track 11 of the actuator through the sliding track channel 121, and the spindle channel 120 is engaging with the spindle. When the driving unit of the actuator drives the spindle rotate, the driving plate 10 will be driven to move on both of the sliding track 11 and the spindle, that is, the driving plate 10 will be able to actuate the component to be driven which connected to the tube 200 to a predetermined position, and a movement and/or extension of the components to be driven is achieved, while the assembly is convenient and fast.

Embodiment 2

Figure 6:
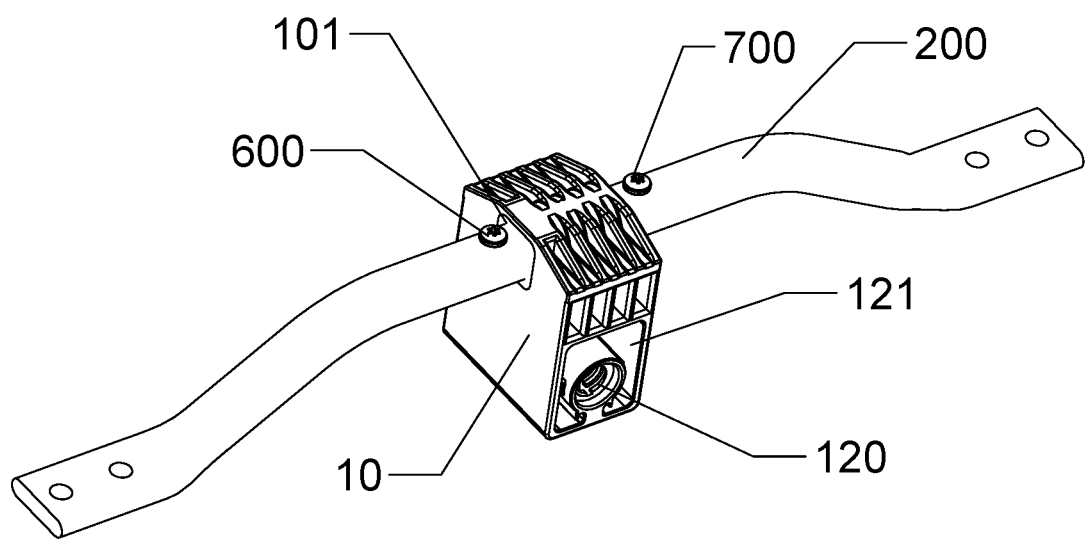
FIG. 6 illustrates a schematic diagram on a structure of another embodiment of the slider for the actuator disclosed in the present disclosure.
Figure 7:
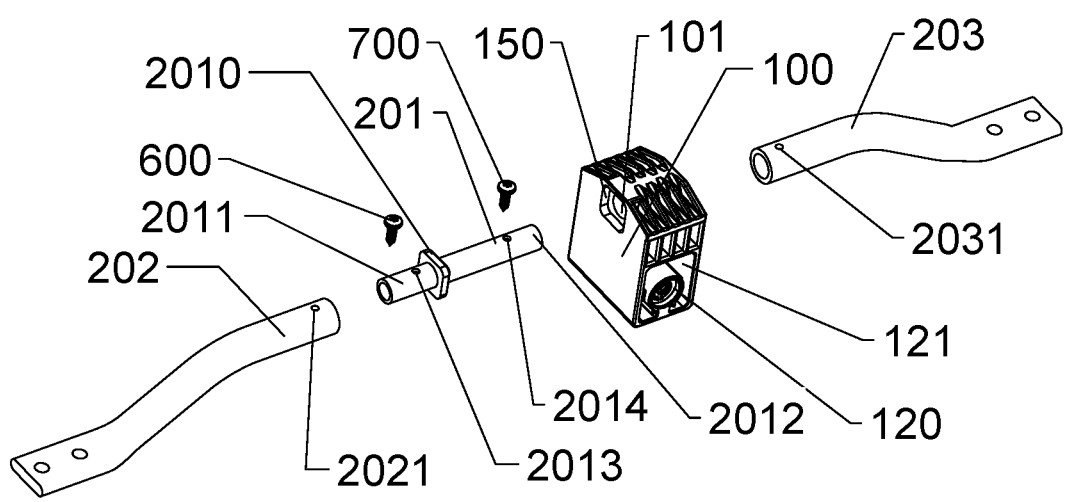
FIG. 7 illustrates an exploded diagram on a structure of another embodiment of the slider for the actuator disclosed in the present disclosure.

As shown in FIG. 6, the driving plate 10 comprises a driving plate body and a driving plate head cover integrally extending out from the driving plate body. Both the linkage lever channel 101 and the sliding track channel 121 locate in the driving plate 10 and penetrate the driving plate 10, at either opposite end of the driving plate 10 respectively. As shown in FIG. 7, the driving plate 10 has a linkage lever arranged, the linkage lever passes through the linkage lever channel 101. In the present embodiment, the linkage lever is a tube 200, the tube 200 comprises an intermediate tube 201, a first split tube 202 and a second split tube 203. The intermediate tube 201 passes through the linkage lever channel 101, locating between the first split tube 202 and the second split tube 203. The first split tube 202 is connected to one end of the intermediate tube 201, and the second split tube 203 opposite to the first split tube 202 is connected to another end of the intermediate tube 201. Three of the tubes may be connected by screws or by fixing pins, no specific methods are limited herein.

Specifically, as shown in FIG. 7, a protruding edge 2010 is extended from the intermediate tube 201, the protruding edge 2010 divides the intermediate tube 201 into a first end 2011 and a second end 2012. The first end 2011 is provided with a first screw through hole 2013, and the second end 2012 is provided with a second screw through hole 2014. One end of the first split tube 202 is provided with a first split tube screw through hole 2021. As shown in FIG. 6, the first split tube 202 and the intermediate tube 201 sleeve on each other, and the first split tube screw through hole 2021 and the first screw through hole 2013 are overlapping each other, before being connected by a screw. Correspondingly, one end of the second split tube 203 is provided with a second split tube screw hole 2031. The second split tube 203 and the intermediate tube 201 sleeve on each other. The second split tube screw through hole 2031 and the second screw through hole 2014 are overlapping each other, before being connected by a screw.

In this embodiment, after the intermediate tube 201 passes through the linkage lever channel 101, the first split tube 202 is sleeved on the first end 2011 of the intermediate tube 201, after the first screw 600 passes through the first split tube screw through hole 2021 and the first screw through hole 2013 sequentially, the first split tube 202 is fixed on the intermediate tube 201, and the second split tube 203 is sleeved on the second end 2012 of the intermediate tube 201, after the second screw 700 passes through the second split tube screw through hole 2031 and the second screw through hole 2014 sequentially, the second split tube 203 is fixed on the intermediate tube 201. In a specific embodiment, a connection method between the first split tube 202 or the second split tube 203 and the intermediate tube 201 is not limited to a screw fixing method, which may also be achieved by using a fixing shaft to substitute the first screw 600 and the second screw 700, as long as achieving fixing the first split tube 202 and the second split tube 203 onto the intermediate tube 201.

Further, the linkage lever channel 101 is provided with a second groove 150 disposed on one side of the driving plate 10, and a size of the second groove 150 is larger than that of an opening of the linkage lever channel 101, while the second groove 150 adapts to the protruding edge 2010. During an assembly process of the present embodiment, after the intermediate tube 201 passes through the linkage lever channel 101, by engaging the protruding edge 2010 with the second groove 150, the intermediate tube 201 is fixed in the driving plate 10. Preferably, the protruding edge 2010 and the second groove 150 are both in a square shape. In order to restrain the intermediate tube 201 from sliding from left to right horizontally, the protruding edge 2010 is engaged and locked with the second groove 150, thereby the first split tube 202 and the second split tube 203 are fixed to the intermediate tube 201 and kept relatively static during the assembly process. Preferably, the second groove 150 is arranged on a side of the linkage lever channel 101 close to the first end 2011, the protruding edge 2010 is also disposed on a side of the intermediate tube 201 close to the first end 2011, which is convenient to sleeve the intermediate tube 201. In a specific embodiment, by changing a position of the protruding edge 2010 on the intermediate tube 201, it is possible to achieve a symmetrical or asymmetrical fixed connection of the first split tube 202 and the second split tube 203 according to the intermediate tube 201, so as to meet a requirement of the tube 200 for different components to be driven in a specific implementation. Further, the protruding edge 2010 may be disposed on both ends of the intermediate tube 201, and the second groove 150 be arranged corresponding to both openings of the linkage lever channel 101 for a better positioning and fixing effect. In a specific embodiment, the intermediate tube 201 passes through the linkage lever channel 101 first, and the protruding edge 2010 is engaged with the second groove 150, then the first split tube 202 is sleeved on the first end 2011 of the intermediate tube 201, by passing the first screw 600 through the first split tube screw through hole 2021 and the first screw through hole 2013, the first split tube 202 is fixedly connected to the intermediate tube 201. Correspondingly, the second split tube 203 is sleeved on second end 2012 of the intermediate tube 201, by passing the second screw 700 through the second split tube screw through hole 2031 and the second screw through hole 2014, the second split tube 203 is fixedly connected to the intermediate tube 201, and that will fix the tube into the driving plate 10. Finally, the tube 200 is connected to a component to be driven, including but not limited to a sofa base, a chair connecting lever, through the sliding track channel 121, the driving plate 10 is sleeved on the sliding track 11 of the actuator and the spindle is meshing with the spindle channel 120. When the actuator starts to drive the spindle rotate, that drives the driving plate 10 move on the sliding track 11, and that will move the component to be driven connecting to the tube 200 to a predetermined position, therefore a movement and extension of the components to be driven will be achieved, while an assembly process is convenient and fast.

In a summary, the present disclosure discloses a slider for an actuator, the slider comprises a driving plate, the driving plate sleeves on a driving unit of the actuator which moves under a driving force of the driving unit, and a linkage lever channel arranged inside the driving plate. A sliding track channel is also arranged inside the driving plate, and the slider is sleeved on the sliding track of the actuator through the sliding track channel. A linkage lever is fixedly arranged onto the driving plate, the linkage lever penetrates the linkage lever channel before connecting with a component to be driven. Comparing to a plurality of problems in the prior art that, an actuator assembly is time-consuming and labor-intensive, due to an assembly between the linkage lever and the slider is difficult, and it is inconvenient to fix a plurality of fixing devices including a screw, The slider for the actuator disclosed in the present disclosure has a simple assembly process and a convenient and fast assembly method, being able to be applied to different components to be driven, to meet different user's requirements and improve assembly efficiency.

What is claimed is:
1. A slider for an actuator, the slider comprising:
a driving plate, the driving plate sleeves on a driving unit of the actuator and moves under a driving force of the driving unit; and a linkage lever channel, arranged in the driving plate and penetrating the driving plate;
wherein the driving plate comprises:
   a driving plate head cover;
   a driving plate body, engaging with the driving plate head cover, and forming the linkage lever channel; and
   a first fixing pin channel, formed by the driving plate head cover engaged with the driving plate body.

2. The slider for the actuator according to claim 1, the slider further comprising:
   a sliding track channel, the sliding track channel penetrates the driving plate, and the driving plate is sleeved on the sliding track of the actuator through the sliding track channel.

3. The slider for the actuator according to claim 2, wherein the linkage lever channel and the sliding track channel are isolated from each other.

4. The slider for the actuator according to claim 3, wherein a spindle channel is disposed inside the sliding track channel.

5. The slider for the actuator according to claim 4, wherein
   the sliding track channel and the spindle channel are arranged in the driving plate body.

6. The slider for the actuator according to claim 1, wherein the driving plate further comprises:
   a second fixing pin channel, arranged inside the driving plate body, and corresponded to the first fixing pin channel; and
   a third fixing pin channel, arranged in the driving plate head cover and corresponded to both the first fixing pin channel and the second fixing pin channel.

7. The slider for the actuator according to claim 6, wherein the driving plate body is provided with a first positioning baffle, the second fixing pin channel is disposed on the first positioning baffle.

8. The slider for the actuator according to claim 7, wherein the driving plate head cover is provided with a second positioning baffle, the third fixing pin channel is disposed on the second positioning baffle, when the driving plate head cover and the driving plate body are engaging with each other, the second positioning baffle and the first positioning baffle are embedded with each other.

9. The slider for the actuator according to claim 5, wherein in the driving plate body, comprising:
   a fixing column, the fixing column is arranged in the linkage lever channel.

10. The slider for the actuator according to claim 9, wherein the driving plate head cover comprises:
    a first groove, when the driving plate head cover and the driving plate body are in the engaging connection state, the fixing column contacts to the first groove.

11. The slider for the actuator according to claim 3, wherein the driving plate is integrally set, the linkage lever channel and the sliding track channel are arranged on an opposite end of the driving plate respectively.

12. The slider for the actuator according to claim 11, wherein a linkage lever is fixedly arranged into the driving plate, the linkage lever penetrates the linkage lever channel, applied to connecting the components to be driven.

13. The slider for the actuator according to claim 12, wherein the linkage lever is a tube.

14. The slider for the actuator according to claim 13, wherein the tube comprises:
    an intermediate tube, the intermediate tube penetrates the linkage lever channel;
    a first split tube, the first split tube connects to one end of the intermediate tube;
    a second split tube, the second split tube is opposite to the first split tube and connecting to the other end of the intermediate tube.

15. A slider for an actuator, the slider comprising:
    a driving plate, the driving plate sleeves on a driving unit of the actuator and moves under a driving force of the driving unit; and
    a linkage lever channel, arranged in the driving plate and penetrating the driving plate,
    wherein a linkage lever is fixedly arranged into the driving plate and penetrates the linkage lever channel,
    wherein the linkage lever comprises:
       an intermediate tube, the intermediate tube penetrates the linkage lever channel;
       a first split tube, the first split tube connects to one end of the intermediate tube; and
       a second split tube, the second split tube is opposite to the first split tube and connects to the other end of the intermediate tube,
    wherein the intermediate tube fixedly connects to the first split tube and the second split tube by a plurality of screws respectively.

16. The slider for the actuator according to claim 15, wherein a groove is arranged on one side of the linkage lever channel, a size of the groove is larger than that of an opening of the linkage lever channel.

17. The slider for the actuator according to claim 16, wherein the intermediate tube has a protruding edge, the protruding edge engages and adapts to the groove.

* * * * *